US012755448B2

(12) United States Patent
Dong

(10) Patent No.: US 12,755,448 B2
(45) Date of Patent: Oct. 6, 2026

(54) ACCELERATED WRITING METHOD, APPARATUS, ELECTRONIC DEVICE AND COMPUTER-READABLE STORAGE MEDIUM

(71) Applicant: SHENZHEN HITEVISION TECHNOLOGY CO., LTD., Guangdong (CN)

(72) Inventor: Yusheng Dong, Beijing (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 105 days.

(21) Appl. No.: 18/963,791

(22) Filed: Nov. 29, 2024

(65) Prior Publication Data

US 2025/0095236 A1 Mar. 20, 2025

Related U.S. Application Data

(63) Continuation of application No. PCT/CN2023/087914, filed on Apr. 12, 2023.

(30) Foreign Application Priority Data

Dec. 2, 2022 (CN) ......................... 202211541549.2

(51) Int. Cl.
*G06T 11/10* (2026.01)

(52) U.S. Cl.
CPC .................................... *G06T 11/10* (2026.01)

(58) Field of Classification Search
CPC ......... G06T 11/10; G06T 7/246; G06T 11/23; G06T 15/20; G06F 3/04883; G06F 3/14; Y02D 10/00
See application file for complete search history.

(56) References Cited

U.S. PATENT DOCUMENTS 11,614,912 B2 * 3/2023 Xiang .................... G06F 3/1454 345/173
2019/0278323 A1 * 9/2019 Aurongzeb ........... G06F 1/1616

FOREIGN PATENT DOCUMENTS

CN 110609653 A 12/2019
CN 113641283 A * 11/2021 ......... G06F 3/04883
(Continued)

OTHER PUBLICATIONS

English translation of WO2022134181A1 (Year: 2022).*
The International search report for PCT Application No. PCT/CN2023/087914, dated Jun. 23, 2023, 7 pages.

*Primary Examiner* — Xiao M Wu
*Assistant Examiner* — Latrell Anthony Creary
(74) *Attorney, Agent, or Firm* — East IP P.C.

(57) ABSTRACT

The present application relates to an accelerated writing method, apparatus, electronic device and computer-readable storage medium, which comprises: sending a first color to a second system under a condition that a first system starts a first writing operation according to a writing input information received with a first color, and simultaneously following the writing input information to display a first writing trajectory; directly sending a display request to the first system by the second system; rendering a first preset trajectory with the first color at the first preset position, and sending an completing command to the second system; obtaining, by the second system, a rendering color of the first preset writing trajectory at the first preset position as a second color; starting, by the second system, the second writing operation with the second color, and following the writing input information received to display a second writing trajectory.

20 Claims, 1 Drawing Sheet

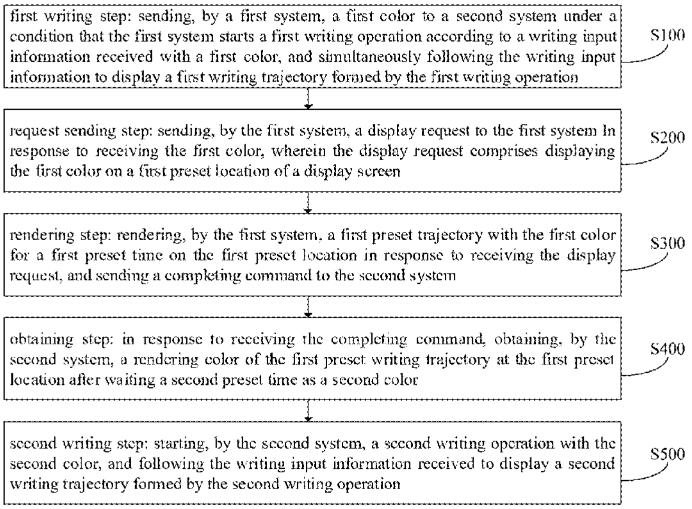

(56) References Cited

FOREIGN PATENT DOCUMENTS

| | | | |
|---|---|---|---|
| CN | 114237481 | A | 3/2022 |
| CN | 114237482 | A | 3/2022 |
| CN | 114356141 | A | 4/2022 |
| CN | 114610186 | A | 6/2022 |
| CN | 115933956 | A | 4/2023 |
| WO | 2022134179 | A1 | 6/2022 |
| WO | 2022134180 | A1 | 6/2022 |
| WO | 2022134181 | A1 | 6/2022 |

* cited by examiner

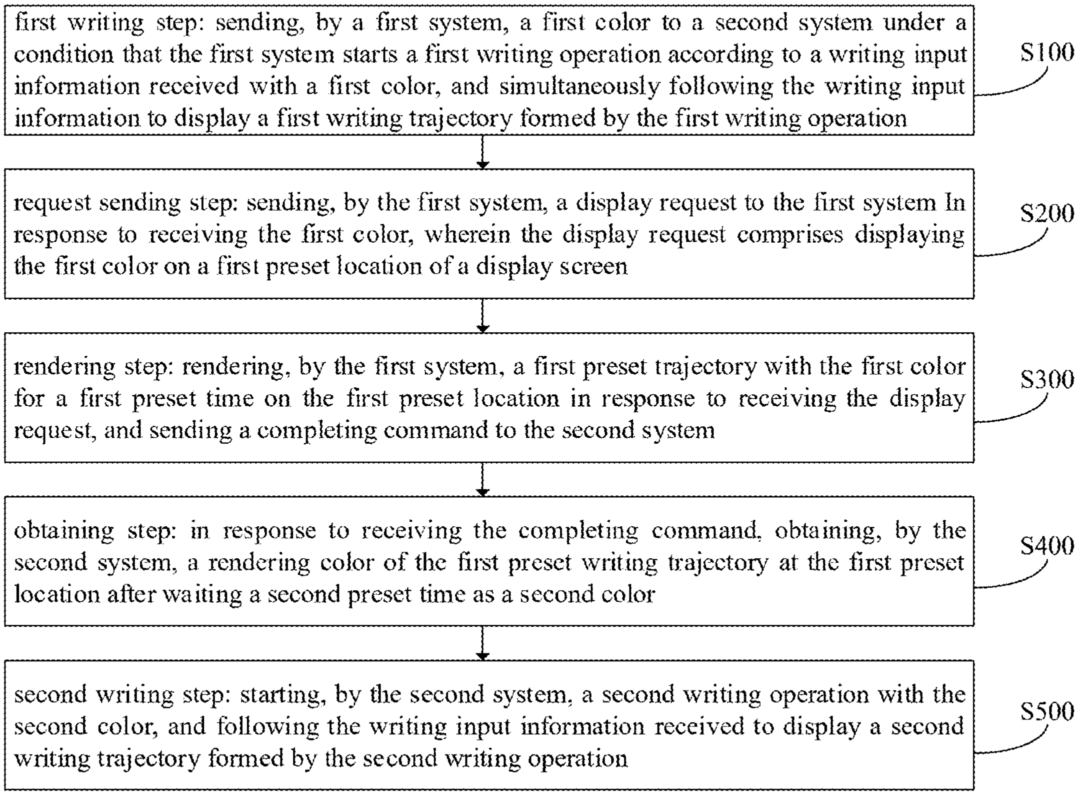
first writing step: sending, by a first system, a first color to a second system under a condition that the first system starts a first writing operation according to a writing input information received with a first color, and simultaneously following the writing input information to display a first writing trajectory formed by the first writing operation
S100
request sending step: sending, by the first system, a display request to the first system In response to receiving the first color, wherein the display request comprises displaying the first color on a first preset location of a display screen
S200
rendering step: rendering, by the first system, a first preset trajectory with the first color for a first preset time on the first preset location in response to receiving the display request, and sending a completing command to the second system
S300
obtaining step: in response to receiving the completing command, obtaining, by the second system, a rendering color of the first preset writing trajectory at the first preset location after waiting a second preset time as a second color
S400
second writing step: starting, by the second system, a second writing operation with the second color, and following the writing input information received to display a second writing trajectory formed by the second writing operation
S500

ACCELERATED WRITING METHOD, APPARATUS, ELECTRONIC DEVICE AND COMPUTER-READABLE STORAGE MEDIUM

CROSS REFERENCE TO RELATED APPLICATION

The present application is a continuation application of International Application No. PCT/CN2023/087914 filed on Apr. 12, 2023, which claims priority to Chinese Patent Application No. 202211541549.2 filed on Dec. 2, 2022, both of which are incorporated herein by reference in their entireties.

TECHNICAL FIELD

The present application relates to the technical field of electronic devices, and in particular to an accelerated writing method, apparatus, electronic device and computer-readable storage medium.

BACKGROUND

Existing electronic devices, such as interactive large screens, normally have two operating systems, which are Windows and Android. Users use the Windows system, a picture of the Windows system is displayed by the Android system, but an interactive large screen is interacted with outside through the Android system, and is displayed by the Android system. When users input on the interactive large screen by writing, first the Android system sends interactive information to the Windows system, which processes the interactive information, and then the Windows system sends the display information to the Android system so as to display it on the large screen. Because the whole process is relatively complex, delay may occur especially when a trajectory is drawn on the interactive large screen.

To solve the technical problem of delay, an accelerated layer is disposed, i.e., a display cache area of the same writing trajectory directly drawn by the Android system is disposed on the interactive large screen. Because the trajectory drawn by the Android system is overlapped with the trajectory drawn by the Android system, and the speed of drawing the trajectory by the Android system is faster than the Windows system, Users may feel that the while trajectory is a trajectory in the Windows system, so that the problem of the delayed display is solved.

SUMMARY

To achieve the above object, embodiments of the present application provide an accelerated writing method, comprising: a first writing step for sending, by a first system, a first color to a second system under a condition that the first system starts a first writing operation according to a writing input information received with a first color, and simultaneously following the writing input information to display a first writing trajectory formed by the first writing operation; a request sending step for sending, by the second system, a display request to the first system in response to receiving the first color, wherein the display request comprises displaying the first color at a first preset position of a display screen; a rendering step for rendering, by the first system, a first preset trajectory with the first color for a first preset time at the first preset position in response to receiving the display request, and sending a completing command to the second system; an obtaining step for in response to receiving the completing command, obtaining, by the second system, a rendering color of the first preset writing trajectory at the first preset position after waiting a second preset time as a second color; a second writing step for starting, by the second system, a second writing operation with the second color, and following the writing input information received to display a second writing trajectory formed by the second writing operation; wherein the second writing trajectory is displayed faster on the display screen than the first writing trajectory.

Optionally, the request sending step further comprises: determining, by the second sytem, whether there is stored the second color in the current display mode of the display screen which color corresponds to the first color, in response to receiving the first color; if yes, then directly obtaining the corresponding second color according to the first color and the current display mode, and directly performing the second writing step; and if not, then sending the display request to the first system, and storing a corresponding relationship among the first color, the current display mode and the second color when the second system receives the second color.

Optionally, the accelerated writing method further comprises: clearing the corresponding relationship among the first color, the current display mode and the second color in a system, in response to detection of a writing termination command; or periodically clearing the corresponding relationship among the first color, the current display mode and the second color.

Optionally, the first preset position is in a non-user operation area of the display screen; the non-user operation area has four corner positions, and there are the first preset positions provided in a number of two, and located at two of the corner positions of a diagonal in the non-user operation area, respectively; the obtaining step comprising: in response to receiving the completing command, obtaining, by the second system, the rendering color of the first preset trajectory at each of the first preset positions after waiting the second preset time; comparing the two rendering colors to determine whether they are consistent with each other; and under the condition that the two rendering colors are consistent with each other, taking the rendering colors as the second color.

Optionally, the display request further comprises: displaying a third color at two second preset positions of the display screen, which are two of the corner positions of the other diagonal in the non-user operation area, respectively, and the third color is different from the first color; the rendering step, before the sending of a completing command, further comprising: rendering the second preset trajectory with the third color at each of the second preset positions for the first preset time; the obtaining step comprising: in response to receiving the completing command, obtaining, by the second system, the rendering color of the first preset trajectory at each of the first preset positions and colors of the second preset trajectories at the second preset positions, and taking colors of the second preset trajectories at the second preset positions as a first check color and a second check color, respectively; comparing the rendering color of the first preset trajectory at each of the first preset positions, the first check color and the second check color, and if the following conditions are satisfied, taking the rendering color as the second color: condition 1: the two rendering colors are consistent with each other; condition 2: the first check color is consistent with the second check color; and condition 3: the first check color and the second check color are inconsistent with the respective adjacent rendering colors.

Optionally, the third color is dark gray, under the condition that the first color is a bright color, or the third color is bright gray, under the condition that the first color is a dark color, the bright color being a color that a RGB value of the color is larger than a preset value; or the third color is an invert color of the first color under the condition that a similarity of the first color with its invert color is beyond a preset similarity range; or under the condition that the similarity of the first color with its invert color is within the preset similarity range, the third color will be dark gray if the first color is a bright color, or the third color will be bright gray if the first color is a dark color.

Optionally, the accelerated writing method further comprises erasing, by the second system, the second writing trajectory in response to receiving a termination command of the current writing input information.

The present application further relates to an accelerated writing apparatus for the foregoing accelerated writing method, comprising a first system and a second system, wherein, the first system comprises: a first writing unit configured to send a first color to the second system under a condition that the first system starts a first writing operation according to a writing input information received with the first color, and simultaneously follow the writing input information to display the first writing trajectory formed by the first writing operation; a rendering unit configured to render a first preset trajectory with the first color for a first preset time at the first preset position in response to receiving the display request, and send a completing command to the second system; and the second system comprises: a request sending unit configured to send a display request to the first system in response to receiving the first color, wherein the display request comprises displaying the first color at the first preset position of the display screen; an obtaining unit configured to, in response to receiving the completing command, obtain a rendering color of the first preset writing trajectory at the first preset position after waiting a second preset time as the second color; the second writing unit configured to start a second writing operation with the second color, and follow the writing input information received to display the second writing trajectory formed by the second writing operation; wherein the second writing trajectory is displayed faster on the display screen than the first writing trajectory.

The present application further relates to an electronic device, comprising the foregoing accelerated writing apparatus, and the electronic device comprises an interactive large screen or an electronic whiteboard.

The present application further relates to a computer-readable storage medium, having an executable program stored thereon, which performs the foregoing accelerated writing method when the executable program is executed.

BRIEF DESCRIPTION OF THE DRAWINGS

Preferred embodiments of an accelerated writing method of the present application will be described below with reference to the accompanying drawings, in which:

FIG. 1 shows a flow block diagram according to a preferred embodiment of an accelerated writing method of the present application.

DETAILED DESCRIPTION

In the following, the present application is described based on embodiments, but not merely these embodiments. In the following detailed description of the present application, some specific details are described in detail. Methods, processes, flows and elements known in the art are not described in detail so as to avoid confusing the substance of the present application.

Furthermore, those skilled in the art may understand that the figures are provided herein for descriptive purpose, and are not necessarily drawn to scale.

Unless clearly indicated otherwise in the context, the wording "comprises", "comprising" and the like shall be construed in an inclusive sense throughout the specification and claims, instead of an exclusive or exhaustive sense. That is to say, it shall be construed as "including, but not limited to".

It should be understand that in the description of the present application, the terms "first", "second" and the like are merely intended to a descriptive purpose, and cannot be interpreted as indicating or implying relative importance. In addition, unless otherwise specified in the description of this application, "a plurality of" means two or more.

Referring to FIG. 1, the present application relates to an accelerated writing method, which is applied to an electronic device. The electronic device has a display function and a writing input function. These two functions may be native functions of the electronic device, or may be capabilities of the system formed by the electronic device through an external device, wherein the writing input function may be implemented specifically by a touch method. Furthermore, the electronic device may have a dual-system architecture comprising a first system and a second system, which may interact data with each other. The first system and the second system each may be any one of the Windows system, the Android system, and the Linux system, and the first system and the second system may be different or same. For example, the first system is the Windows system, and the second system is the Android system. As another example, the first system is the Linux system, the second system is the Android system. The first system and the second system may interact data with each other. Specifically, the electronic device may be an interactive large screen, an electronic whiteboard or the like. The interactive large screen or electronic whiteboard may have a native first system and native second system, or the interactive large screen or electronic whiteboard may have only a native second system, and the first system is provided by an external component such as an external open pluggable specification (OPS) computer, which has the first system.

For the ease of understanding, the final displays of the first writing trajectory, the second writing trajectory, the first preset trajectory and the second preset trajectory in the present application all are displayed by the display screen of the electronic screen, but displaying the first writing trajectory, the first preset trajectory and the second preset trajectory is implemented on the display screen by the first system through the second system (for the convenience of description, hereafter referred to as "displayed by the first system"), and the second writing trajectory is directly displayed on the display screen by the second system (for the convenience of description, hereafter referred to as "displayed by the second system").

The accelerated writing method of the present application comprises the following steps S100-S500:

the first writing step (S100): sending, by a first system, a first color to a second system under a condition that the first system starts a first writing operation according to a writing input information received with a first color, and simultaneously following the writing input information to display a first writing trajectory formed by the first writing operation;

a request sending step (S200): sending, by the second system, a display request to the first system in response to receiving the first color, wherein the display request comprises displaying the first color at a first preset position of a display screen;

a rendering step (S300): rendering, by the first system, a first preset trajectory with the first color for a first preset time at the first preset position in response to receiving the display request, and sending a completing command to the second system;

an obtaining step (S400): in response to receiving the completing command, obtaining, by the second system, a rendering color of the first preset writing trajectory at the first preset position after waiting a second preset time as a second color;

a second writing step (S500): starting, by the second system, a second writing operation with the second color, and following the writing input information received to display a second writing trajectory formed by the second writing operation, wherein the second writing trajectory is displayed faster on the display screen than the first writing trajectory.

In step S100, the writing input information comprises a writing trajectory and a writing color (a first color). Therefore, the first system can start the first writing operation according to the writing input information, so that the first writing trajectory is displayed with the first color. Here, the writing input information may specifically be a touch information.

The first system may have multiple display modes, for example, a standard mode, a bright mode, a vivid mode, an eye-protecting mode and so on, and a same color has different RGB values of the color in different display modes. For example, the RGB value of red is (255, 1, 0) in the standard mode, (255, 0, 0) in the vivid mode, and (252, 1, 0) in the eye-protecting mode.

In step S100, the first system performs the writing operation (i.e., displaying the first writing trajectory) following the writing input information, and simultaneously the first system sends the first color to the second system.

In step S200, after the second system receives the first color, to obtain the actual color (i.e., the following rendering color) displayed on the display screen by the first color, the second system may send the display request comprising the first preset position of the display screen, so that the proceeding first system may display the first preset trajectory with the first color at a specified position (the first preset position) of the second system to facilitate that the second system obtains the rendering color from the position.

The first preset position is a position specified by the second system. That is to say, the first preset position is not constant, but the first preset position is determined by the second system according to the actual display situation of the display screen.

In some situations, the first system is not displayed in full screen, and the position of the first system may adjusted as needed. Meanwhile, the second system determines the first preset position within a display range of the first system according to the actual display situation of the first system.

The second system in the present application determines the first preset position according to the display of the first system, and the position is sent to the first system to ensure that the position that the second system obtains the rendering color is consistent with the position that the first system display the first preset trajectory.

In step S300, the first system may display the first preset trajectory with the first color at the first preset position of the display screen, so that the display screen may display the first color in the current display mode of the first system. Specifically, the first preset trajectory may be displayed by the second system on the display screen after the first system writes the first preset trajectory with the first color. Therefore, the color displayed on the display screen for the first preset trajectory is completely consistent with the color displayed on the display screen for the first writing trajectory to facilitate subsequently obtaining the actual first color (i.e., the color displayed on the display screen for the first color) by the second system from the first preset trajectory, so that the color of the second writing trajectory subsequently displayed by the second system is completely consistent with the color displayed on the display screen for the first writing trajectory.

Furthermore, the position displayed on the display screen for the first preset trajectory is the first preset position determined by the second system to facilitate that the second system obtains the rendering color from the specific position.

A size of the first preset trajectory may be selected to be relatively small, so that users basically does not perceive the existence of the first preset trajectory, thereby avoiding the influence of the first preset trajectory on users and ensuring the user experience. The shape of the first preset trajectory may be a square block, a circular block, a triangular block, or any other shape, as long as it is ensured that the second system may obtain the corresponding rendering color from the first preset trajectory in the subsequent step S400.

The time for displaying the first preset trajectory is the first preset time. After the first preset time elapses, the first preset trajectory should be cleared to avoid that the first preset trajectory is displayed on the display screen for too long time, and also to avoid that the first preset trajectory exists for a long time to possibly affect the user operation, so that the user experience is better improved.

The first preset time may set as need, and for example, the first preset time is 500-1500 ms, such as 500 ms, 600 ms, 800 ms, 1000 ms, 1200 ms or 1500 ms and so on.

In step S300, the second system may send the completing command, as long as the display screen displays the first preset trajectory.

In step S400, after the second system receives the completing command, the rendering color of the first preset trajectory may be obtained at the first preset position of the display screen, and the obtained rendering color may be referred to as the second color.

After the second system receives the completing command, rather than the rendering color being obtained at the first preset position immediately, the rendering color should be obtained after waiting the second preset time. Although the first system displays the first preset trajectory by the display screen, the display screen may have certain delay because the same reason in the background, rather than the first preset trajectory being displayed at the first time. The second preset time may cover the delay, so that the first preset position may actually display the first preset trajectory after the second preset time, thereby ensuring that the second system may accurately obtain the rendering color, and avoiding that the second system obtains a wrong color because the delay display.

The foregoing delay time of displaying the first preset trajectory normally is 0-100 ms, for example, Oms, 20 ms, 40 ms, 60 ms, 80 ms or 100 ms, which depend on the actual situation and here are given just for example. The second preset time is longer than the delay time, and shorter than the first preset time. The second preset time is set as specifically needed, and may be 100-300 ms, for example, 100 ms, 150 ms, 200 ms, 250 ms or 300 ms.

In step S500, the second system starts the second writing operation according to the writing input information, so that the second writing trajectory is displayed on the display screen, and the second color is taken as the color of the second writing trajectory. The colors eventually displayed on the display screen for the first writing trajectory and the second writing trajectory are exactly the same, because the second color is identical to the rendering color of the first preset trajectory which color is identical to the color displayed on the display screen for the first writing trajectory.

The first writing trajectory and the second writing trajectory are formed according to the same writing input information, i.e., the shape of the first writing trajectory is exactly consistent with the shape of the second writing trajectory, and the first writing trajectory overlaps the second writing trajectory on the display screen. The second writing trajectory is displayed by the second system, and may be displayed faster on the display screen than the first writing trajectory, so that the second writing trajectory may implement the acceleration of the first writing trajectory. After completing the first writing trajectory (when the current writing input information ends; specifically, when the writing termination command may be detected), the second writing trajectory may be cleared. Then, only the first writing trajectory is displayed on the display screen. Because the second writing trajectory is completely identical to the first writing trajectory, users may not perceive that the second writing trajectory is eliminated, so that the user experience is ensured.

In some embodiments, the electronic device pre-stores the corresponding relationship among the first color, the display mode and the second color, and the second system may directly obtain the second color according to the corresponding relationship, so that no further foregoing step S300 and step S400 need to be performed.

In the embodiment, step S200 comprises the following steps S210-S230:

- S210, after the second system receives the first color, determining whether there is stored the second color in the current display mode (i.e., the display mode of the first system) of the display screen which color corresponds to the first color, wherein the second system may obtain the current display mode using any one of various methods of the related art;
- S220, if yes, then directly obtaining the corresponding second color according to the first color and the current display mode, and directly performing the second writing step;
- S230, if not, then sending the display request to the first system.

In step S200, it is determined first whether the first color and the second color corresponding to the current display mode of the first system exist in the corresponding relationship, and if the corresponding relationship exists, the second color may be directly obtained according to the corresponding relationship, so that step S500 may be directly performed subsequently.

If the corresponding relationship does not exist, step S300 and step S400 should be performed, so that the corresponding relationship obtains the second color. In step S200, if the determination result is no, the command (the display request) should be sent to the first system, so that step S300 is performed by the first system.

After completing step S400, the corresponding relationship among the first color, the current display mode and the second color is obtained. Then, the corresponding relationship may be stored in the electronic device, so that the whole range of corresponding relationships is extended to facilitate the subsequent writing, and the second color is directly obtained in the case of the same first color and display mode without performing steps S300 and S400 any more. Therefore, the time for obtaining the second color is shortened, the formation of the second writing trajectory is further accelerated, and the accelerated writing efficiency of the second system is improved.

There are some differences among the display screens of different electronic devices, so that different electronic devices have the problem of color deviation when displaying the same color. Additionally, given that the electronic device may age after longtime use, the foregoing corresponding relationship need to be adaptively adjusted according to different electronic devices and durations of use.

As a result, in a preferred embodiment of the present application, the second system does not pre-store the corresponding relationship among the first color, the current display mode and the second color, but a corresponding relationship table may be temporarily stored each time the writing software is started. The corresponding relationship table is cleared when the current writing software is shut down. Specifically, after each time the writing software is started, the corresponding relationship among the first color, the current display mode and the second color is obtained after step S400 is performed, so that it is ensured that the corresponding relationship as obtained may be completely matched with the electronic device, and then if the first color and the current display mode existing in the corresponding relationship occur subsequently, and the second color matched with the first color may be directly obtained according to the corresponding relationship in step S200. Therefore, the time of obtaining the second color is shortened, the formation of the second writing trajectory is further accelerated, and the accelerated writing efficiency of the second system is improved.

Furthermore, the accelerated writing method further comprises step S600, which clears the corresponding relationship among the first color, the current display mode and the second color in a system when the writing termination command is ended.

The corresponding relationship among the first color, the current display mode and the second color in the present application works only when the accelerated writing method is performed. When the writing termination command is detected, it is indicated that no writing input information is further performed, so that the foregoing corresponding relationship may be deleted so as to reduce the system burden. Specifically, the writing termination command may be a command of shutting down the writing software. That is to say, the corresponding relationship among the first color, the current display mode and the second color is restored each time the writing software is reloaded.

Undoubtedly, step S600 can be not performed. That is to say, after the writing ends, the foregoing corresponding relationship may still be stored in the system to facilitate invoking the writing input information at the next time.

In an embodiment in which the corresponding relationship is still stored in the system, the corresponding relationship should be cleared after ending a writing. For example, it is cleared once for 3 months (it may also be other time, for example, 6 months or 1 years, etc., and the time of periodic clearing is manually set), so as to prevent the electronic device from aging causing deviation of the corresponding relationship.

To the first preset position, the first preset position is preferably located in the non-user operation area of the display screen.

An image displayed by the first system through the display screen comprises the user operation area and non-user operation area. Users perform a writing input in the user operation area, so that the first preset position is disposed in the non-user operation area by the second system. Therefore, in step S300, it may be avoided that the first preset trajectory displayed by the first system disturbs the user operation area and also that the displayed first preset trajectory is disturbed by other information inputted by users or even erased by users before the displayed first preset trajectory is obtained by the second system so as to render the obtained second color inaccurate.

Taking a drawing as an example, the first system displays a whiteboard for drawing and an external frame outside the whiteboard. The whiteboard is the user operation area, and the external frame is the non-user operation area. During drawing, the user performs a writing operation in the area of the whiteboard, so that the first preset position is located on the external frame to avoid disturbing the writing input information.

Undoubtedly, in another embodiment, the first preset position may be located in the user operation area of the display screen, or in the marginal position of the user operation area, so that the disturbing of the writing operation is reduced; the position where the beginning end of the first writing trajectory is located is taken as the first preset position, and a trajectory of the beginning end is taken as the first preset trajectory.

In an embodiment in which the first preset position is in the non-user operation area, non-user operation area have four corner positions. In an embodiment, one first preset position is disposed and specifically may be one of corner positions. In another embodiment, two first preset positions are disposed and are two corner positions of a diagonal of the non-user operation area respectively, and in this embodiment, step S400 comprises:

obtaining, by the second system, the rendering color of the first preset trajectory at each of the first preset positions after waiting the second preset time; comparing the two rendering colors to determine whether they are consistent with each other; and under the condition that the two rendering colors are consistent with each other, taking the rendering colors as the second color.

In some situations, because some known or unknown reasons, the first preset trajectory is not displayed at the first preset position when the first system attempts to display the first preset trajectory at the first preset position, so that there is some difference between the position of the first preset trajectory and the first preset position. In step S400, the second system still obtains the rendering color at the first preset position, which results in the rendering color obtained by the second system being different from the color of the first preset trajectory.

To solve the problem, in an embodiment of the present application, two first preset positions are disposed, and these two preset positions are located at two corner positions of a diagonal of the non-user operation area respectively. In step S300, the first system displays the first preset trajectory at the two first preset positions. In actual applications, a side of the display screen of the electronic device has a lower probability of being shifted, for example, an upper side is shifted by certain size downwards, so that one of the first preset positions may not display the first preset trajectory, and the situation in which the wrong rendering color is obtained may occur. Additionally, the two first preset positions are disposed at the two corner positions of a diagonal. Normally, only the situation in which the display panel have one shifted side may occur. Therefore, only the situation of one wrong rendering color may occur when one side is shifted. It may be determined whether the rendering colors respectively obtained by the two first preset positions are consistent with each other; if yes, the rendering color may be the second color; otherwise, it may mean that at least one of the first preset positions may not display the first preset trajectory, so that the second color cannot be determined.

Furthermore, whether the two rendering colors are consistent with each other means that the RGB values of the two rendering colors are close to each other. Specifically, each difference value of R, G and B between the two rendering colors is calculated separately; if the three difference values all are less than a set value, which normally may be 3-5, for example, 3, 4 and 5, then the two rendering colors may be considered close; otherwise, the two rendering colors may be considered inconsistent with each other.

Furthermore, in another embodiment of the present application, if the two rendering colors are inconsistent with each other, the second color may not be obtained, and therefore step S500 need not to be performed, i.e., the second system does not accelerate the second writing trajectory.

Undoubtedly, in some situations, a situation that two opposite sides of the display screen shift may occur, for example, an upper side shifts downwards, and an lower side shifts upwards, so that the upper and lower sides have a black edge simultaneously, and both the two first preset trajectories have color deviation. Then, both the two rendering colors as obtained are black (the color of the black edge), leading to the situation in which the wrong second color is obtained.

To avoid occurring the situation of obtaining a wrong color, in an embodiment of the present application, in step S200, the display request further comprises: displaying the third color at the second preset position of the display screen, wherein there are two second preset positions, which are two corner positions of another diagonal in the non-user operation area, respectively, and the third color is the color that is different from the first color.

In step S300, before the sending of the completing command, step S300 further comprises: rendering the second preset trajectory with the third color in the first preset time at each of the second preset positions. That is to say, the first system displays the first preset trajectory with the first color at the first preset position, and the second preset trajectory with the third color at the second preset position; and the first preset trajectory and the second preset trajectory are displayed and disappeared simultaneously.

In step S400, when receiving the completing command and after waiting for the second preset time, the second system obtains the rendering color of the first preset trajectory at each of the first preset positions and colors of the second preset trajectories at the second preset positions, and taking colors of the second preset trajectories at the second preset positions as a first check color and a second check color, respectively;

the second system compares the rendering color of the first preset trajectory at each of the first preset positions, the first check color and the second check color, and if the following conditions are satisfied, takes the rendering color as the second color:

condition 1: the two rendering colors are consistent with each other;

condition 2: the first check color is consistent with the second check color; and condition 3: the first check color and the second check color are inconsistent with the respective adjacent rendering colors.

As an example, the two first preset positions are located at the upper left corner and the lower right corner of the non-user operation area respectively, and the two second preset positions are located at the lower left corner and the upper right corner of the non-user operation area.

In step S400, the second system obtains the colors at four preset positions. The colors obtained at two first preset positions are the rendering colors, which are the actual color of the first color theoretically. Two check colors are obtained at two second preset positions obtain. For example, the first check color is obtained at the second preset position of the lower left corners, and the second check color is obtained at the second preset position of the upper right corner. Theoretically the first check color should be identical to the second check color, and the first check color and the second check color are the color in which the third color actually displayed through the display screen.

In the situation in which both the upper side and the lower side are black edges, the two check colors as obtained are black. Then, the obtained rendering colors are consistent with the two check colors, resulting in failure to satisfy the condition 3, so that it can be determined that a wrong rendering color is obtained, and the rendering color shall not be taken as the second color.

Furthermore, if the first color is a bright color, the third color may be dark gray; if the first color is a dark color, the third color may be bright; wherein the bright color is the color whose RGB value is larger than a preset value.

If the first color is a bright color, the rendering color should also be bright; if the third color is dark gray, the first check color and the second check color should also be dark gray; therefore, it is easy for the second system to determine whether the foregoing condition 3 is satisfied. Likewise, if the first color is dark, the rendering color should also be dark; if the third color is bright gray, the first check color and the second check color are also bright gray, so that no matter the first color is bright or dark, it is easy for the second system to determine whether the condition 3 is satisfied through the third color corresponding to the first color.

In the embodiment, a bright or dark color of gray is selected as the third color, or a bright or dark color of other colors is selected as the third color.

The R value of the RGB value of the foregoing bright color is larger than 180, the G value thereof is larger than 180, and the B value thereof is larger than 180.

At least one value of the R value, G value and B value in the RGB value of the dark color is less than or equal to 180.

As previously mentioned, the second preset trajectories are located at two corner positions of the other diagonal of the non-user operation area. Generally the positions of the second preset trajectories may overlap a title bar and a task bar, and the selection of gray may result in the color of the second preset trajectory is close to the color of the title bar and the task bar, thereby avoiding disturbing users. Furthermore, the R value, G value and B value of gray are equal, so that only one value need to be obtained so as to perform the comparisons required by the condition 2 and the condition 3, thereby making the processing convenient. The third color may adopt a bright color or a dark color of other colors, for example, a bright red color, a dark red color, a bright yellow color or a dark yellow color.

In other embodiments, the third color may be an invert color of the first color, but in some situations, the invert color of some color is close to the first color, so that the determination of the condition 3 by the second system may be affected.

For example, the RGB value of gray is (127, 127, 127), its invert color is gray (128, 128, 128), and therefore the first color is relatively close to the third color at this time, so that the determination of the condition 3 is not facilitated.

Therefore, in the embodiment in which the third color is the invert color of the first color, the invert color of the first color is obtained first according to the first color, and then a similarity of the first color with the invert color thereof is determined. If the similarity of the first color with the invert color thereof is beyond the similarity range, i.e., the first color is quite different from the invert thereof, then the invert of the first color may be taken as the third color; otherwise (within the similarity range), the invert color of the first color may not be taken as the third color.

To determine whether the similarity of the first color with the inverse color of the first color is beyond the similarity range or not, the R value, G value and B value of the first color are compared with the R value, G value and B value of the invert color of the first color, respectively; if the differences of the R value, G value and B value between the two colors are within the preset range, then the two colors are not beyond the similarity range. For example, the preset range is from 1 to 50, and may be adjusted as needed.

If it is determined that the invert color of the first color cannot be taken as the third color, the third color may be determined as dark gray or bright gray according to the bright color or dark color of the foregoing first color, and details are not described herein again.

When receiving the termination command of the current writing input information, the second system erases the second writing trajectory.

Taking a drawing as an example, the user performs the writing input information on the display screen of the electronic device through a finger or a stylus, and when the writing input information ends (the stylus is lifted), the second system displays the second writing trajectory, and should erase the second writing trajectory after the first system completes the first writing trajectory.

The present application further relates to the accelerated writing apparatus for the foregoing accelerated writing method, which comprises a first system and a second system, wherein the first system comprises: a first writing unit configured to send a first color to the second system under a condition that the first system starts a first writing operation according to a writing input information received with the first color, and simultaneously following the writing input information to display the first writing trajectory formed by the first writing operation; a rendering unit configured to render a first preset trajectory with the first color for a first preset time at the first preset position in response to receiving the display request, and send a completing command to the second system; and the second system comprises: a request sending unit configured to send a display request to the first system in response to receiving the first color, wherein the display request comprises displaying the first color at the first preset position of the display screen; an obtaining unit configured to, in response to receiving the completing command, obtain a rendering color of the first preset writing trajectory at the first preset position after waiting a second preset time as the second color; the second writing unit configured to start a second writing operation with the second color, and following the writing input information received to display the second writing trajectory formed by the second writing operation; wherein the second writing trajectory is displayed faster on the display screen than the first writing trajectory.

Under a condition that the first system of the present application displays the first writing trajectory with the first color according to the writing input information, the first system further displays the first preset trajectory with the first color, the second system obtains a color of the first preset trajectory, and the second writing trajectory is started in the color of the first preset trajectory, so that the color of the first writing trajectory is consistent with the color of the second writing trajectory, and the user experience is ensured.

The present application further relates to an electronic device, which comprises the above accelerated writing apparatus, and the electronic device may be an interactive large screen or an electronic whiteboard.

The present application further relates to a computer-readable storage medium, having an executable program stored thereon, which performs the above accelerated writing method when the executable program is executed.

It should be noted that the computer-readable storage medium in embodiments of the present application is not limited by the above provided embodiments, for example, the computer-readable storage medium may be electronic, magnetic, optical, electromagnetic, infrared or any semiconductor system, apparatus or device, or any combination thereof. A specific example of the computer-readable storage medium may include, but be not limited to: an electronic connection having one or more wires, a portable computer diskette, a hard disk, a random access memory (RAM), a read-only memory (ROM), an erasable programmable read-only memory (EPROM or a Flash memory), an optical fiber, a compact disc read-only memory (CD-ROM), an optical processor, a magnetic processor, or any suitable combination of the foregoing. In embodiments of the present application, the computer-readable storage medium may be any tangible media containing or storing a program which may be used by an instruction execution system, apparatus or device or incorporated thereto.

Those skilled in the art may understand that each of the above preferable solutions may freely combined and superimposed without any conflict. The flowcharts and block diagrams in the accompanying drawings illustrate architectures, functions and operations that may be implemented according to the systems, methods and computer program products of the various embodiments of the present application. At this point, each block in the flowcharts or block diagrams may represent a module, a program segment, or part of codes, wherein the module, program segment, or part of codes contain one or more executable instructions for implementing a prescribed logic function. It should also be noted that, in some alternative implementations, the functions denoted by the blocks may occur in a sequence different from the sequences shown in the accompanying drawings. For example, two blocks shown in succession may, in fact, be performed substantially concurrently, or the blocks may sometimes be performed in the reverse order, specifically depending upon the functionality involved. It should also be noted that each block in the block diagrams and/or flowcharts as well as a combination of blocks in the block diagrams and/or flowcharts may be implemented using a dedicated hardware-based system executing specified functions or operations, or by a combination of dedicated hardware and computer instructions. The numbers of the steps in the present application are only for convenience of description and reference, and are not intended to limit the order before and after, and the specific execution order is determined by the technology itself, and those skilled in the art may determine various allowed and reasonable orders according to the technology itself.

It should be noted that the present application adopts step numbers (letters or numbers) to indicate some specific method steps for the purpose of the convenient and brief description only, and this letters or numbers in no way limit the order of these steps. Those skilled in the art can understand that an order of method steps should be determined by technology itself, and not be improperly limited because of the occurrence of the step number. Those skilled in the art may determine various allowable and reasonable step orders according to the technology itself.

Those skilled in the art may understand that each of the above preferable solutions may freely combined and superimposed without any conflict.

It should be understood that the foregoing embodiments are merely exemplary and not restrictive, and that various obvious or equivalent modifications or substitutions that can be made by those skilled in the art with respect to the foregoing details without departing from the basic principles of this application will all be included in the claims of this application.

What is claimed is:

1. An accelerated writing method, comprising:

a first writing step: sending, by a first system, a first color to a second system under a condition that the first system starts a first writing operation according to a writing input information received with a first color, and simultaneously following the writing input information to display a first writing trajectory formed by the first writing operation;

a request sending step: sending, by the second system, a display request to the first system in response to receiving the first color, wherein the display request comprises displaying the first color at a first preset position of a display screen;

a rendering step: rendering, by the first system, a first preset trajectory with the first color for a first preset time at the first preset position in response to receiving the display request, and sending a completing command to the second system;

an obtaining step: in response to receiving the completing command, obtaining, by the second system, a rendering color of the first preset writing trajectory at the first preset position after waiting a second preset time as a second color;

a second writing step: starting, by the second system, a second writing operation with the second color, and following the writing input information received to display a second writing trajectory formed by the second writing operation, wherein the second writing trajectory is displayed faster on the display screen than the first writing trajectory.

2. The accelerated writing method according to claim 1, wherein the request sending step further comprises:

determining, by the second system, whether there is stored the second color in the current display mode of the display screen which color corresponds to the first color, in response to receiving the first color;

if yes, then directly obtaining the corresponding second color according to the first color and the current display mode, and directly performing the second writing step; and if not, then sending the display request to the first system, and storing a corresponding relationship among the first color, the current display mode and the second color when the second system receives the second color.

3. The accelerated writing method according to claim 2, further comprising:

clearing the corresponding relationship among the first color, the current display mode and the second color in a system in response to detection of a writing termination command; or periodically clearing the corresponding relationship among the first color, the current display mode and the second color.

4. The accelerated writing method according to claim 1, wherein the first preset position is in a non-user operation area of the display screen; the non-user operation area has four corner positions, and there are the first preset positions provided in a number of two and located at two of the corner positions of a diagonal in the non-user operation area, respectively;

the obtaining step comprising:

in response to receiving the completing command, obtaining, by the second system, the rendering color of the first preset trajectory at each of the first preset positions after waiting the second preset time; comparing the two rendering colors to determine whether they are consistent with each other; and under the condition that the two rendering colors are consistent with each other, taking the rendering colors as the second color.

5. The accelerated writing method according to claim 4, wherein the display request further comprises: displaying a third color at two second preset positions of the display screen, which are two of the corner positions of the other diagonal in the non-user operation area, respectively, and the third color is different from the first color;

the rendering step, before the sending a completing command, further comprising:

rendering the second preset trajectory with the third color at each of the second preset positions for the first preset time;

the obtaining step comprising:

in response to receiving the completing command, obtaining, by the second system, the rendering color of the first preset trajectory at each of the first preset positions and colors of the second preset trajectories at the second preset positions, and taking colors of the second preset trajectories at the second preset positions as a first check color and a second check color, respectively;

comparing the rendering color of the first preset trajectory at each of the first preset positions, the first check color and the second check color, and if the following conditions are satisfied, taking the rendering color as the second color:

condition 1: the two rendering colors are consistent with each other;

condition 2: the first check color is consistent with the second check color; and condition 3: the first check color and the second check color are inconsistent with the respective adjacent rendering colors.

6. The accelerated writing method according to claim 5, wherein the third color is dark gray under the condition that the first color is a bright color, or the third color is bright gray under the condition that the first color is a dark color, the bright color being a color that a RGB value of the color is larger than a preset value; or the third color is an invert color of the first color under the condition that a similarity of the first color with its invert color is beyond a preset similarity range; or under the condition that the similarity of the first color with its invert color is within the preset similarity range, the third color is dark gray if the first color is a bright color, or the third color is bright gray if the first color is a dark color.

7. The accelerated writing method according to claim 1, further comprising erasing, by the second system, the second writing trajectory in responding to receiving a termination command of the current writing input information.

8. A non-transitory computer-readable storage medium, having an executable program stored thereon, which performs the accelerated writing method according to claim 1 when the executable program is executed.

9. An accelerated writing apparatus, comprising a first system and a second system, wherein the first system comprises:

a first writing unit configured to send a first color to the second system under a condition that the first system starts a first writing operation according to a writing input information received with the first color, and simultaneously follow the writing input information to display the first writing trajectory formed by the first writing operation;

a rendering unit configured to render a first preset trajectory with the first color for a first preset time at the first preset position in response to receiving the display request, and send a completing command to the second system; and the second system comprises:

a request sending unit configured to send a display request to the first system in response to receiving the first color, wherein the display request comprises displaying the first color at the first preset position of the display screen;

an obtaining unit configured to, in response to receiving the completing command, obtain a rendering color of the first preset writing trajectory at the first preset position after waiting a second preset time as the second color;

the second writing unit configured to start a second writing operation with the second color, and follow the writing input information received to display the second writing trajectory formed by the second writing operation;

wherein the second writing trajectory is displayed faster on the display screen than the first writing trajectory.

10. The accelerated apparatus according to claim 9, wherein the second system is further configured to determine whether there is stored the second color in the current display mode of the display screen which color corresponds to the first color, in response to receiving the first color;

if yes, then directly obtaining the corresponding second color according to the first color and the current display mode, and directly performing the second writing step; and if not, then sending the display request to the first system, and storing a corresponding relationship among the first color, the current display mode and the second color when the second system receives the second color.

11. The accelerated apparatus according to claim 9, wherein the first preset position is in a non-user operation area of the display screen; the non-user operation area has four corner positions, and there are the first preset positions provided in a number of two, and located at two of the corner positions of a diagonal in the non-user operation area, respectively; and the second system is configured to obtain the rendering color of the first preset trajectory at each of the first preset position after waiting the second preset time in response to receiving the completing command, compare the two rendering colors to determine whether they are consistent with each other, and under a condition that the two rendering colors are consistent with each other, and take the rendering colors as the second color.

12. The accelerated apparatus according to claim 11, wherein the display request further comprises: displaying a third color at two second preset positions of the display screen, which are two of the corner positions of the other diagonal in the non-user operation area, respectively, and the third color is different from the first color; and the first system is further configured to render the second preset trajectory with the third color at each of the second preset positions for the first preset time, before the sending a completing command;

the second system is further configured to obtain the rendering color of the first preset trajectory at each of the first preset positions and colors of the second preset trajectories at the second preset positions, and taking colors of the second preset trajectories at the second preset positions as a first check color and a second check color respectively, in response to receiving the completing command;

the second system is further configured to compare the rendering color of the first preset trajectory at each of the first preset positions, the first check color and the second check color, and if the following conditions are satisfied, taking the rendering color as the second color:

condition 1: the two rendering colors are consistent with each other;

condition 2: the first check color is consistent with the second check color; and condition 3: the first check color and the second check color are inconsistent with the respective adjacent rendering colors.

13. The accelerated apparatus according to claim 12, wherein the third color is dark gray under the condition that the first color is a bright color, or the third color is bright gray under the condition that the first color is a dark color, the bright color being a color that a RGB value of the color is larger than a preset value; or, the third color is an invert color of the first color under the condition that a similarity of the first color with its invert color is beyond a preset similarity range; or under the condition that the similarity of the first color with its invert color is within the preset similarity range, the third color is dark gray if the first color is a bright color, or the third color is bright gray if the first color is a dark color.

14. The accelerated apparatus according to claim 9, wherein the second system is further configured to erase the second writing trajectory, in responding to receiving a termination command of the current writing input information.

15. An electronic device, comprising an interactive large screen or an electronic whiteboard, wherein the electronic device comprises a first system and a second system, the first system comprising:

a first writing unit configured to send a first color to the second system under a condition that the first system starts a first writing operation according to a writing input information received with the first color, and simultaneously follow the writing input information to display the first writing trajectory formed by the first writing operation;

a rendering unit configured to render a first preset trajectory with the first color for a first preset time at the first preset position in response to receiving the display request, and send a completing command to the second system; and the second system comprising:

a request sending unit configured to send a display request to the first system in response to receiving the first color, wherein the display request comprises displaying the first color at the first preset position of the display screen;

an obtaining unit configured to in response to receiving the completing command, obtain a rendering color of the first preset writing trajectory at the first preset position after waiting a second preset time as the second color;

the second writing unit configured to start a second writing operation with the second color, and follow the writing input information received to display the second writing trajectory formed by the second writing operation;

wherein the second writing trajectory is displayed faster on the display screen than the first writing trajectory.

16. The electronic device according to claim 15, the second system is further configured to determine whether there is stored the second color in the current display mode of the display screen which color corresponds to the first color, in response to receiving the first color;

if yes, then directly obtaining the corresponding second color according to the first color and the current display mode, and directly performing the second writing step;

if not, then sending the display request to the first system, and storing a corresponding relationship among the first color, the current display mode and the second color when the second system receives the second color.

17. The electronic device according to claim 15, wherein the first preset position is in a non-user operation area of the display screen; the non-user operation area has four corner positions, and there are the first preset positions provided in a number of two, and located at two of the corner positions of a diagonal in the non-user operation area, respectively; and the second system is configured to obtain the rendering color of the first preset trajectory at each of the first preset position after waiting the second preset time in response to receiving the completing command, compare the two rendering colors to determine whether they are consistent with each other, and under the condition that the two rendering colors are consistent with each other, and take the rendering colors as the second color.

18. The electronic device according to claim 16, wherein the display request further comprises: displaying a third color at two second preset positions of the display screen, which are two of the corner positions of the other diagonal in the non-user operation area, respectively, and the third color is different from the first color;

the first system is further configured to render the second preset trajectory with the third color in the first preset time at each of the second preset positions for the first preset time, before the sending a completing command;

the second system is further configured to obtain the rendering color of the first preset trajectory at each of the first preset positions and colors of the second preset trajectories at the second preset positions, and taking colors of the second preset trajectories at the second preset positions as a first check color and a second check color respectively, in response to receiving the completing command;

the second system is further configured to compare the rendering color of the first preset trajectory at each of the first preset positions, the first check color and the second check color, and if the following conditions are satisfied, taking the rendering color as the second color:

condition 1: the two rendering colors are consistent with each other;

condition 2: the first check color is consistent with the second check color; and condition 3: the first check color and the second check color are inconsistent with the respective adjacent rendering colors.

19. The electronic device according to claim 18, wherein the third color is dark gray, under the condition that the first color is a bright color, or the third color is bright gray, under the condition that the first color is a dark color, the bright color being a color that a RGB value of the color is larger than a preset value; or, the third color is an invert color of the first color under the condition that a similarity of the first color with its invert color is beyond a preset similarity range; or under the condition that the similarity of the first color with its invert color is within the preset similarity range, the third color is dark gray if the first color is a bright color, or the third color is bright gray if the first color is a dark color.

20. The electronic device according to claim 15, wherein the second system is configured to erases the second writing trajectory, in response to receiving a termination command of the current writing input information.

* * * * *